United States Patent
Tsuzuki et al.

(10) Patent No.: US 9,997,969 B2
(45) Date of Patent: Jun. 12, 2018

(54) EMBEDDED MAGNET MOTOR AND ROTOR OF EMBEDDED MAGNET MOTOR

(71) Applicant: AISIN SEIKI KABUSHIKI KAISHA, Kariya-shi, Aichi-ken (JP)

(72) Inventors: Takanori Tsuzuki, Toyota (JP); Daisuke Miyata, Obu (JP)

(73) Assignee: AISIN SIEKI KABUSHIKI KAISHA, Kariya-shi, Aichi-ken (JP)

( * ) Notice: Subject to any disclaimer, the term of this patent is extended or adjusted under 35 U.S.C. 154(b) by 273 days.

(21) Appl. No.: 14/879,284

(22) Filed: Oct. 9, 2015

(65) Prior Publication Data
US 2016/0111924 A1 Apr. 21, 2016

(30) Foreign Application Priority Data
Oct. 16, 2014 (JP) .................... 2014-211325

(51) Int. Cl.
*H02K 1/27* (2006.01)
*H02K 29/03* (2006.01)

(52) U.S. Cl.
CPC ............. *H02K 1/276* (2013.01); *H02K 29/03* (2013.01); *H02K 2201/03* (2013.01); *H02K 2213/03* (2013.01)

(58) Field of Classification Search
CPC ...... H02K 1/276; H02K 1/2766; H02K 29/03; H02K 2201/03; H02K 2213/03
USPC .................................................... 310/156.53
See application file for complete search history.

(56) References Cited

U.S. PATENT DOCUMENTS

| | | | |
|---|---|---|---|
| 2002/0153796 A1 | 10/2002 | Yoshinaga et al. | |
| 2005/0200223 A1* | 9/2005 | Tajima | H02K 1/2766 310/156.46 |
| 2009/0140590 A1 | 6/2009 | Hung | |
| 2010/0166575 A1* | 7/2010 | Fukuda | H02K 1/276 417/410.1 |
| 2010/0181864 A1* | 7/2010 | Miura | H02K 1/2766 310/216.094 |

(Continued)

FOREIGN PATENT DOCUMENTS

| | | | |
|---|---|---|---|
| JP | 2000295805 A | * | 10/2000 |
| JP | 2007-006657 A | | 1/2007 |
| WO | 2013098921 A1 | | 7/2013 |

OTHER PUBLICATIONS

Miura et al., Machine Translation of JP2000295805, Oct. 2000.*
Communication dated Mar. 24, 2016, from the European Patent Office in counterpart European Application No. 15189280.9.

*Primary Examiner* — Quyen Leung
*Assistant Examiner* — Eric Johnson
(74) *Attorney, Agent, or Firm* — Sughrue Mion, PLLC

(57) ABSTRACT

An embedded magnet motor includes a stator core, a plurality of permanent magnets each having a rectangular cross section, and a rotor core. The stator core and the rotor core define a first air gap being positioned at an intermediate portion of the rotor core, a second air gap being positioned at a first portion corresponding to a first axis of the rotor core, and a third air gap being positioned at a second portion corresponding to a second axis of the rotor core. Because a diameter of the intermediate portion being positioned between the first portion and the second portion of the rotor core is set smaller than a diameter of the first portion and than a diameter of the second portion, the first air gap is set greater than the second air gap and than the third air gap.

9 Claims, 4 Drawing Sheets

(56) References Cited

U.S. PATENT DOCUMENTS

| | | | |
|---|---|---|---|
| 2011/0062814 A1* | 3/2011 | Adaniya | H02K 1/276 |
| | | | 310/156.53 |
| 2012/0133239 A1* | 5/2012 | Taema | H02K 1/276 |
| | | | 310/216.094 |
| 2013/0154425 A1* | 6/2013 | Nakada | H02K 1/2766 |
| | | | 310/156.53 |
| 2013/0270961 A1 | 10/2013 | Chu | |
| 2014/0368081 A1 | 12/2014 | Yabe et al. | |
| 2016/0301268 A1* | 10/2016 | Watanabe | H02K 9/19 |

\* cited by examiner

⇐---- Magnetic flux in d axis direction

⇐—— Magnetic flux in q axis direction

Ratio of width W6 of magnet path of q axis to width W1 of teeth

EMBEDDED MAGNET MOTOR AND ROTOR OF EMBEDDED MAGNET MOTOR

CROSS REFERENCE TO RELATED APPLICATIONS

This application is based on and claims priority under 35 U.S.C. § 119 to Japanese Patent Application 2014-211325, flied on Oct. 16, 2014, the entire content of which is incorporated herein by reference.

TECHNICAL FIELD

This disclosure generally relates to an embedded magnet motor and a rotor of the embedded magnet motor.

BACKGROUND DISCUSSION

A known embedded magnet motor including a rotor core being embedded with permanent magnets is disclosed in JP2007-6857A (hereinafter referred to as Patent reference 1). An intermediate portion of the permanent magnet of the embedded magnet motor is formed thick and gradually comes to be thinner towards opposing end portions of the magnet. Thus, the thicker the permanent magnet is (can be the thickest at the intermediate portion), the more difficult it is for a magnetic flux to pass through. As a result, the magnetic flux passing in a q-axis direction is apt to pass through the rotor while the magnetic flux being formed by an armature winding and passing in a d-axis direction passes through the rotor with difficulty. Accordingly, because the difference in amount between a q-axis inductance $L_q$ and a d-axis inductance $L_d$ is increased, a reluctance torque (a torque of an attraction force being generated between the magnetic field from a stator core and a salient pole of the rotor core) can be increased. The d-axis serves as a direction of a main magnetic flux. The q-axis serves as a direction electrically orthogonal to the d axis. The reluctance torque is proportional to the difference in amount between the q-axis inductance $L_q$ and the d-axis inductance $L_d$.

According to the embedded magnet motor disclosed in Patent reference 1, the rotor core is formed in a round shape when seen from an axial direction of the rotor core.

However, according to the embedded magnet motor disclosed in Patent reference 1, because the intermediate portion of the permanent magnet is formed thick and gradually comes to be thinner towards the opposing end portions of the magnet, a rectangular permanent magnet is required to be processed. Accordingly, the yield rate of the permanent magnet comes to be decreased. In addition, because the rotor core is formed in the round shape when seen from the axial direction of the rotor core, the waveform of an induced voltage being generated by the armature winding comes to be largely deformed from a sinewave.

A need thus exists for an embedded magnet motor and a rotor of the embedded magnet motor which is not susceptible to the drawback mentioned above.

SUMMARY

According to the an aspect of this disclosure, an embedded magnet motor includes a stator core, plural permanent magnets each having a rectangular cross section, and a rotor core being provided so as to face the stator core, the rotor core being embedded with the permanent magnets. The stator core and the rotor core define a first air gap being positioned at an intermediate portion of the rotor core, the first gap being positioned between the stator core and the rotor core. The stator core and the rotor core define a second air gap being positioned at a first portion corresponding to a first axis of the rotor core, the second air gap being positioned between the stator core and the rotor core. The stator core and the rotor core define a third air gap being positioned at a second portion corresponding to a second axis of the rotor core, the third air gap being positioned between the stator core and the rotor core. On a basis of the first axis being extended in a same direction as a main magnetic flux and the second axis serving as a direction electrically orthogonal to the first axis, because a diameter of the intermediate portion being positioned between the first portion and the second portion of the rotor core is set smaller than a diameter of the first portion and than a diameter of the second portion, the first air gap is set greater than the second air gap and than the third air gap.

According to another aspect of this disclosure, an embedded magnet motor includes plural permanent magnets each having the rectangular cross section and the rotor core being embedded with the permanent magnets, the rotor core being provided so as to be configured to face the stator core. The stator core and the rotor core are configured to define the first air gap being positioned at the intermediate portion of the rotor core, the first gap being configured to be positioned between the stator core and the rotor core. The stator core and the rotor core are configured to define the second air gap being configured to be positioned at the first portion corresponding to the first axis of the rotor core, the second air gap being configured to be positioned between the stator core and the rotor core. The stator core and the rotor core are configured to define the third air gap being positioned at the second portion corresponding to the second axis of the rotor core, the third air gap being configured to be positioned between the stator core and the rotor core. On a basis of the first axis being extended in the same direction as the main magnetic flux and the second axis serving as the direction electrically orthogonal to the first axis, because the diameter of the intermediate portion being positioned between the first portion and the second portion of the rotor core is set smaller than the diameter of the first portion and than the diameter of the second portion, the first air gap is set greater than the second air gap and than the third air gap.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of this disclosure will hereunder be explained with reference to the drawings.

A structure of an embedded magnet motor 100 of the embodiment will be explained with reference to FIGS. 1 and 2.

Figure 1:
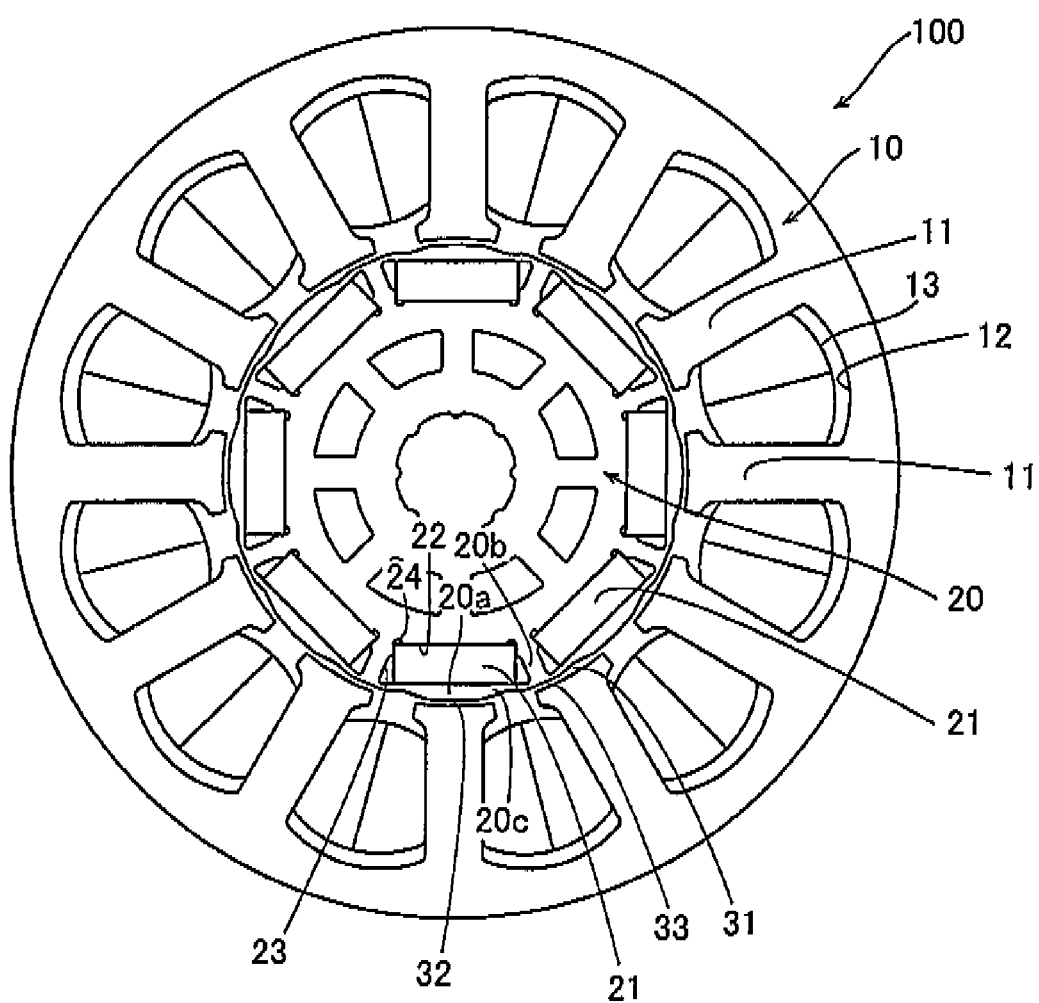
FIG. 1 is a front view of an embedded magnet motor according to an embodiment disclosed here.

As shown in FIG. 1, the embedded magnet motor 100 includes a stator core 10 and a rotor core 20. The rotor core 20 is provided at an inner side of the annular stator core 10 so as to face the stator core 10.

Plural teeth 11 are provided at an inner circumference of the stator core 10. A slot 12 is provided at a portion between the teeth 11 that are positioned next to each other. Each of the teeth 11 (the slot 12) is wound with a winding wire 13.

Figure 2:
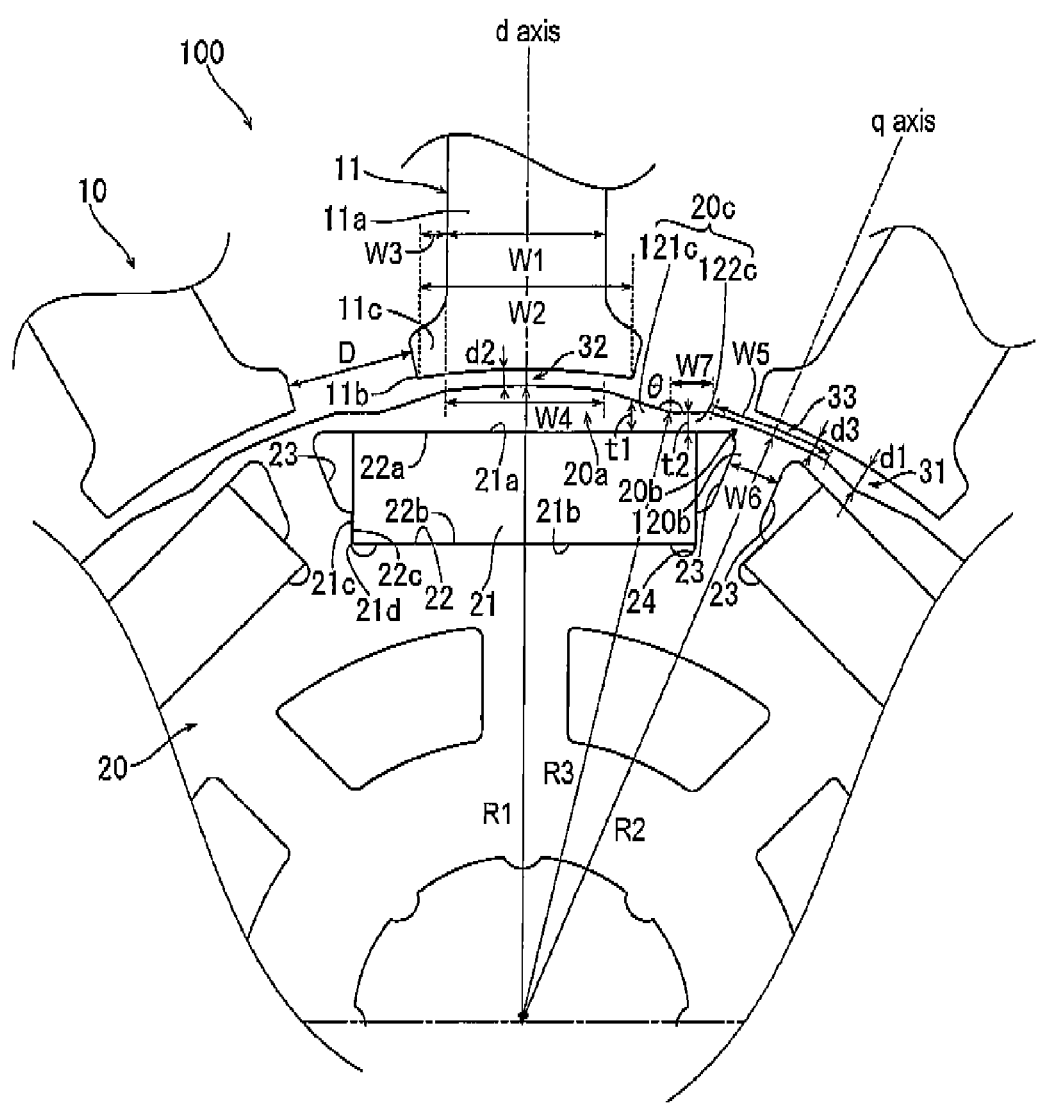
FIG. 2 is an enlarged view of the embedded magnet motor according to the embodiment.

As shown in FIG. 2, each of the teeth 11 includes a wound portion 11a and a distal end portion 11b. The wound portion 11a is wound with the winding wire 13. The distal end portion 11b is provided at an inner periphery of the teeth 11. A first width W1 (i.e., serving as a width) is a width of the wound portion 11a of the teeth 11, the wound portion 11a being wound with the winding wire 13, the first width W1 being positioned in a tangential direction of an outer circumference of the rotor core 20. A second width W2 (i.e., serving as a width) is a width of the distal end portion 11b of the teeth 11, the second width W2 being positioned in the tangential direction of the outer circumference of the rotor core 20. A third width W3 (=W2−W1) (i.e., serving as a width) is a width of a protrusion 110 (a portion protruding in a peripheral direction of the distal end portion 11b of the teeth 11 from the wound portion 11a). A space D between the teeth 11 that are next to each other is smaller than the first width W1 of the wound portion 11a of the teeth 11, the first width W1 being positioned in the tangential direction (D<W1).

According to the embodiment, the rotor core 20 is embedded with plural permanent magnets 21 each having a rectangular (an oblong-shaped) cross section when seen from the axial direction of the rotor core 20. The permanent magnet 21 is made by, for example, sintering and is formed in a block shape that has the rectangular (the oblong-shaped) cross section.

The permanent magnet 21 is fitted into a hole portion 22 being provided at the rotor core 20. The hole portion 22 is formed in a trapezoidal shape when seen from the axial direction of the rotor core 20. An inner surface 22a and an inner surface 22b of the hole portion 22 support a side surface 21a and a side surface 21b of the permanent magnet 21, respectively. The inner surface 22a is positioned at a side where an outer circumferential surface of the rotor core 20 is positioned. The inner surface 22b is positioned at a side where an inner circumferential surface of the rotor core 20 is positioned. The side surface 21a is positioned at a side where the outer circumference of the rotor core 20 is positioned. The side surface 21b is positioned at a side where the inner circumference of the rotor core 20 is positioned. The hole portion 22 includes a protruding surface 22c that protrudes inwardly of the hole portion 22. The protruding surface 22c supports a side surface 21c of the permanent magnet 21, the side surface 21c that is positioned in the circumferential direction of the rotor core 20.

The hole portion 22 is provided so as to be extended outwardly in the circumferential direction of the rotor core 20 relative to the side surface 21c of the permanent magnet 21 when defining a direction towards a center of the hole portion 22 as an inward direction of the rotor core 20. Thus, clearances 23 are provided outwardly of a portion of the rotor core 20 in the circumferential direction, the portion where the permanent magnet 21 is embedded. The clearance 23 inhibits the permanent magnet 21 from being demagnetized. The hole portion 22 is provided so as to be extended inwardly in a radial direction of the rotor core 20 relative to the side surface 21b of the permanent magnet 21, the side surface 21b that is positioned at the side where the inner circumference of the rotor core 20 is positioned. Thus, clearances 24 are provided inwardly of a portion of the rotor core 20 in the radial direction, the portion where the permanent magnet 21 is embedded. The clearance 24 is provided so as to release a corner portion 21d of the permanent magnet 21.

The rotor core 20 is provided with a first portion 20a and a second portion 20b. The first portion 20a of the rotor core 20 corresponds to a d-axis (i.e., serving as a first axis). The second portion 20b of the rotor core 20 corresponds to a q-axis (i.e., serving as a second axis). In the embodiment, the first portion 20a serves as a portion (a portion having a fourth width W4 (i.e., serving as a width)) that includes the d-axis and that has a constant diameter R1. The second portion 20b serves as a portion (a portion having a fifth width W5) that includes the q-axis and that has a constant diameter R2. In other words, the first portion 20a serves as the portion that includes the d-axis and that is positioned from the d-axis to an intermediate portion 20c of the rotor core 20. The second portion 20b serves as the portion that includes the q-axis and that is positioned from the q-axis to the intermediate portion 20c of the rotor core 20. According to the embodiment, the diameter R1 and the diameter R2 are equal to each other (R1=R2).

Figure 3:
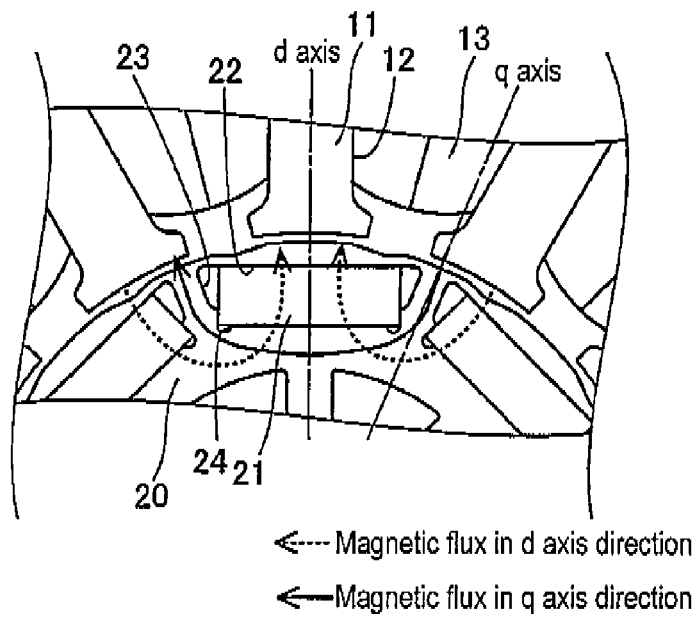
FIG. 3 is an explanatory view of magnetic fluxes of the embedded magnet motor passing in a d-axis direction and in a q-axis direction according to the embodiment.

As shown in FIG. 3, the d-axis serves as a direction of a main magnetic flux (a direction along the diameter R1 (see FIG. 2) that passes through a center of the permanent magnet 21). The q-axis serves as a direction electrically orthogonal to the d-axis. The magnetic flux passing in the d-axis direction passes through the permanent magnet 21 so as to penetrate the permanent magnet 21. The magnetic flux passing in the q-axis direction passes through the rotor core 20 so as not to penetrate the permanent magnet 21. Because the magnetic permeability of the permanent magnet 21 is low, the d-axis inductance $L_d$ comes to be comparatively low. On the other hand, because the magnetic permeability of the rotor core 20 is high, the q-axis inductance $L_q$ comes to be comparatively high ($L_q$>$L_d$). Thus, the saliency ratio ($L_q/L_d$) of the embedded magnet motor 100 is greater than, for example, 1. The reluctance torque is proportional to the difference in amount between the q-axis inductance $L_q$ and the d-axis inductance $L_d$. That is, the reluctance torque is increased as the difference in amount between the q-axis inductance $L_q$ and the d-axis inductance $L_d$ is increased. The reluctance torque is decreased as the difference in amount between the q-axis inductance $L_q$ and the d-axis inductance $L_d$ is decreased.

According to the embodiment, as shown in FIG. 2, the fourth width W4 of the first portion 20a (the portion having the constant diameter R1) of the rotor core 20, the fourth width W4 that is positioned in the tangential direction of the outer circumference of the rotor core 20, is set smaller than a second width W2 of the distal end portion 11b of the teeth 11, the second width (W2) that is positioned along the tangential direction (W4<W2). For example, the fourth width W4 has a dimension that is 67 percent of the dimension of the second width W2.

The fifth width W5 is a width of the second portion 20b (the portion having the constant diameter R2) of the rotor core 20, the fifth width W5 that is positioned in the tangential direction of the outer circumference of the rotor core 20. The second portion 20b includes a third portion 120b that corresponds to a magnetic path of the q-axis. The third portion 120b corresponding to the magnetic path includes a portion that is sandwiched by the clearances 23. A sixth width W6 (i.e., serving as a width) of the third portion 120b being positioned in the tangential direction is constant, or substantially constant along the diameter R2 direction. That is, the sixth width W6 of the third portion 120b has a constant-, or a substantially-constant width. According to the embodiment, the sixth width W6 of the third portion 120b corresponding to the magnetic path, the sixth width W6 that is positioned along the tangential direction of the outer circumference of the rotor core 20, is equal to or greater than 20 percent and is equal to or lower than 32 percent of the first width W1 of the wound portion 11a of the teeth 11, the wound portion 11a that is wound with the winding wire 13, the first width W1 that is positioned along the tangential direction of the outer circumference of the rotor core 20. Specifically, in FIG. 2 the sixth width W6 has a dimension that is 31 percent of the dimension of the first width W1.

The sixth width W6 of the third portion 120b of the rotor core 20 is greater than the third width W3 of the protrusion 11c protruding in the peripheral direction of the distal end portion 11b of the teeth 11, the third width W3 being positioned in the tangential direction (W6>W3).

Here, according to the embodiment, the intermediate portion 20c is provided at a portion between the first portion 20a and the second portion 20b. The intermediate portion 20c of the rotor core 20 includes a first section 121c and a second section 122c. The first section 121c is positioned radially outward relative to a portion where the permanent magnet 21 is positioned. The second portion is positioned radially outward relative to the clearance 23. The diameter R3 of the intermediate portion 20c is set smaller than the diameter R1 of the first portion 20a and than the diameter R2 of the second portion 20b (R3<R1=R2). Accordingly, according to the embedded magnet motor 100, a first air gap 31 that is positioned at the intermediate portion 20c and being positioned between the stator core 10 and the rotor core 20 is set greater than a second air gap 32 (a third air gap 33) that is positioned at the first portion 20a (at the second portion 20b) and being positioned between the stator core 10 and the rotor core 20. That is, a dimension (clearance) d1 of the first air gap 31 in a diameter direction is greater than a dimension d2 (d3) of the second air gap 32 (the third air gap 33) in the diameter direction (d1>d2=d3).

According to the embodiment, the intermediate portion 20c is formed in a V-shape, when seen from the axial direction of the rotor core 20, so as the first air gap 31 to gradually decrease after gradually increasing towards the q-axis from the d-axis. Specifically, a length t1 of the first section 121c of the intermediate portion 20c comes to be gradually shorter towards the q-axis from the d-axis. A length t2 of the second section 122c of the intermediate portion 20c is constant, or substantially constant towards the q-axis from the d-axis. The intermediate portion 20c is formed in the V-shape when seen from the axial direction of the rotor core 20. A seventh width W7 of the second section 122c, the seventh width W7 that is positioned along the tangential direction is smaller than the sixth width W6 of the third portion 120b (W7<W6).

An angle θ of a base portion of the V-shaped intermediate portion 20c, the base portion that is provided at an inner portion of the intermediate portion 20c in the diameter direction, is an obtuse angle when seen from the axial direction of the rotor core 20. Specifically, the angle θ in FIG. 2 is 162 degrees, for example.

The intermediate portion 20c is provided at a first side and a second side in the circumferential direction of the first portion 20a. The intermediate portion 20c is provided at a first side and a second side in the circumferential direction of the second portion 20b.

Figure 4:
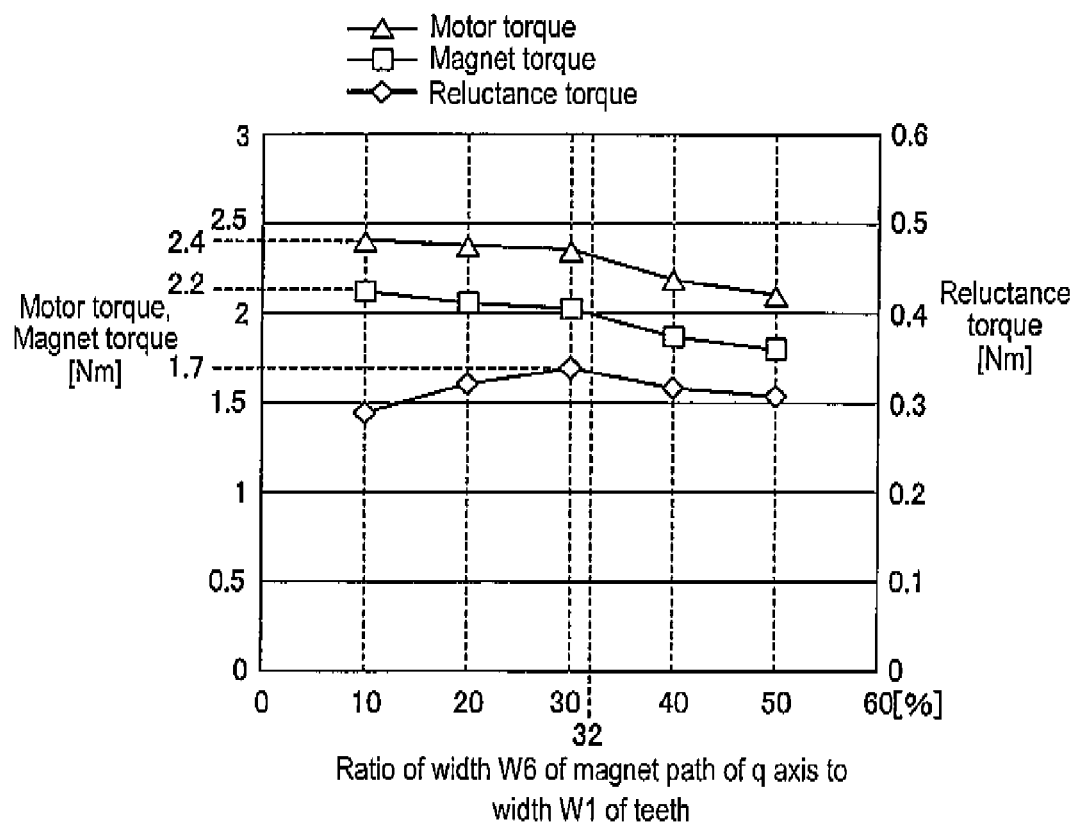
FIG. 4 is a view illustrating a relationship between a width of a magnetic path passing in the q-axis direction and a reluctance torque, a magnet torque and a motor torque.

Next, an experiment of the relationship of the sixth width W6 of the third portion 120b and a reluctance torque, a magnet torque and a motor torque of the embedded magnet motor 100 will be explained with reference to FIG. 4. In FIG. 4, a lateral axis shows a ratio (percent) of the sixth width W6 of the third portion 120b to the first width W1 of the wound portion 11a of the teeth 11. A longitudinal axis illustrated at left shows the magnitude (newton per meter or Nm) of the magnet torque and the motor torque. A longitudinal axis illustrated at right shows the magnitude of the reluctance torque [Nm].

As shown in FIG. 4, in this experiment, the ratios of the sixth width W6 of the third portion 120b to the first width W1 of the teeth 11 are 10 percent, 20 percent, 30 percent, 40 percent and 50 percent. As a result, the reluctance torque comes to be gradually increased as the ratio is increased from 10 percent. When the ratio is 30 percent, it is identified that the reluctance torque comes to be at the maximum level (approximately 1.7 Nm). It is further identified that the reluctance torque comes to be gradually decreased as the ratio is increased from 30 percent.

It is identified that the magnet torque comes to be at the maximum level (approximately 2.2 Nm) when the ratio is 10 percent. It is further identified that the magnetic torque comes to be gradually decreased as the ratio is increased from 10 percent. It is identified that the magnet torque comes to be decreased largely when the ratio exceeds 30 percent, comparing to the case where the ratio is equal to or less than 30 percent. It is identified that the motor torque, the same as the magnet torque, comes to be at the maximum level (approximately 2.4 Nm) when the ratio is 10 percent. It is identified that the motor torque comes to be gradually decreased as the ratio is increased from 10 percent.

The result of this experiment identifies that it is favorable that the ratio of the sixth width W6 of the third portion 120b to the first width W1 of the wound portion 11a of the teeth 11 is equal to or greater than 20 percent and is equal to or lower than 32 percent.

According to the embodiment, following effects and advantages may be attained.

According to the embodiment, the first air gap 31 being positioned at the intermediate portion 200 and being positioned between the stator core 10 and the rotor core 20 is set greater than the second air gap 32 (the third air gap 32) that is positioned at the first portion 20a (the second portion 20b) and being positioned between the stator core 10 and the rotor core 20. The intermediate portion 20c is positioned between the first portion 20a and the second portion 20b. Thus, because the magnetic flux passing in the d-axis hardly passes through the intermediate portion 20c, the d-axis inductance $L_d$ can be decreased. As a result, because the difference in amount between the q-axis inductance $L_q$ and the d-axis inductance $L_d$ comes to be increased, the reluctance (a torque of an attraction force being generated between the magnetic field from the stator core 10 and the saliency of the rotor core 20) can be increased. In addition, as described above, the plural permanent magnets 21 each having the rectangular cross section are embedded to the rotor core 20. Thus, unlike a case where the permanent magnet 21 having the rectangular cross section is processed to decrease the d-axis inductance $L_d$, the yield rate of the permanent magnet 21 can be inhibited from being decreased. As described above, because the diameter R3 of the intermediate portion 20c is set smaller than the diameter R1 of the first portion 20a and than the diameter R2 of the second portion 20b, the shape of the outer circumference of the rotor core 20 can be brought close to the sinewave. Accordingly, the waveform of the induced voltage is prevented from being largely deformed from the sinewave. As a result, the reluctance torque can be increased while inhibiting the yield rate of the permanent magnet 21 from being decreased and inhibiting the waveform of the induced voltage from being largely deformed from the sinewave.

According to the embodiment, as described above, the intermediate portion 20c is formed in the V-shape when seen from the axial direction of the rotor core 20 so as the first air gap 31 to gradually decrease after gradually increasing towards the q-axis from the d-axis. Accordingly, because the shape of the outer circumference of the rotor core 20 can be brought close to the sinewave, the waveform of the induced voltage can be further brought close to the sinewave.

According to the embodiment, as described above, the sixth width W6 of the third portion 120b of the second portion 20b of the rotor core 20 is equal to or greater than 20 percent and is equal to or less than 32 percent of the first width W1 of the wound portion 11a of the teeth 11 of the stator core 10, the wound portion 11a being wound with the winding wire 13. Accordingly, the motor torque can be increased while comparatively increasing the reluctance torque and the magnet torque (the torque of the attraction force and the repulsive force that are generated between the magnetic field from the stator core 10 and the permanent magnet 21), which is confirmed by the experiment performed by the inventor of this disclosure.

According to the embodiment, as described above, the first portion 20a serves as the portion that includes the d-axis and that has the constant diameter R1. The second portion 20b serves as the portion that includes the q-axis and that has the constant diameter R2. Accordingly, because the diameter R1 (R2) does not change, or is constant, or substantially constant at the first portion 20a (the second portion 20b), each of the dimensions of the second and third air gaps 32, 33 does not change, or is constant, or substantially constant. Thus, the difference between the dimension of the first air gap 31 and of the second air gap 32 (the third air gap 33) can securely occur. The first air gap 31 is positioned at the intermediate portion 20c and has the third diameter R3 that is smaller than the first diameter R1 (the second diameter R2) of the first portion 20a (the second portion 20b). The second air gap 32 (the third air gap 33) is positioned at the first portion 20a (the second portion 20b) of the rotor core 20.

According to the embodiment, as described above, the fourth width W4 of the first portion 20a having the constant diameter R1, the fourth width W4 is set smaller than the second width W2 of the distal end portion 11b of the teeth 11 of the stator core 10. Thus, because the first portion 20a having the constant diameter R1, can be comparatively small, the dimension of the intermediate portion 20c can be increased that much. As a result, because the shape of the outer circumference of the rotor core 20 can be brought close to the sinewave, the waveform of the induced voltage can be inhibited from being largely deformed from the sinewave.

Figure 5:
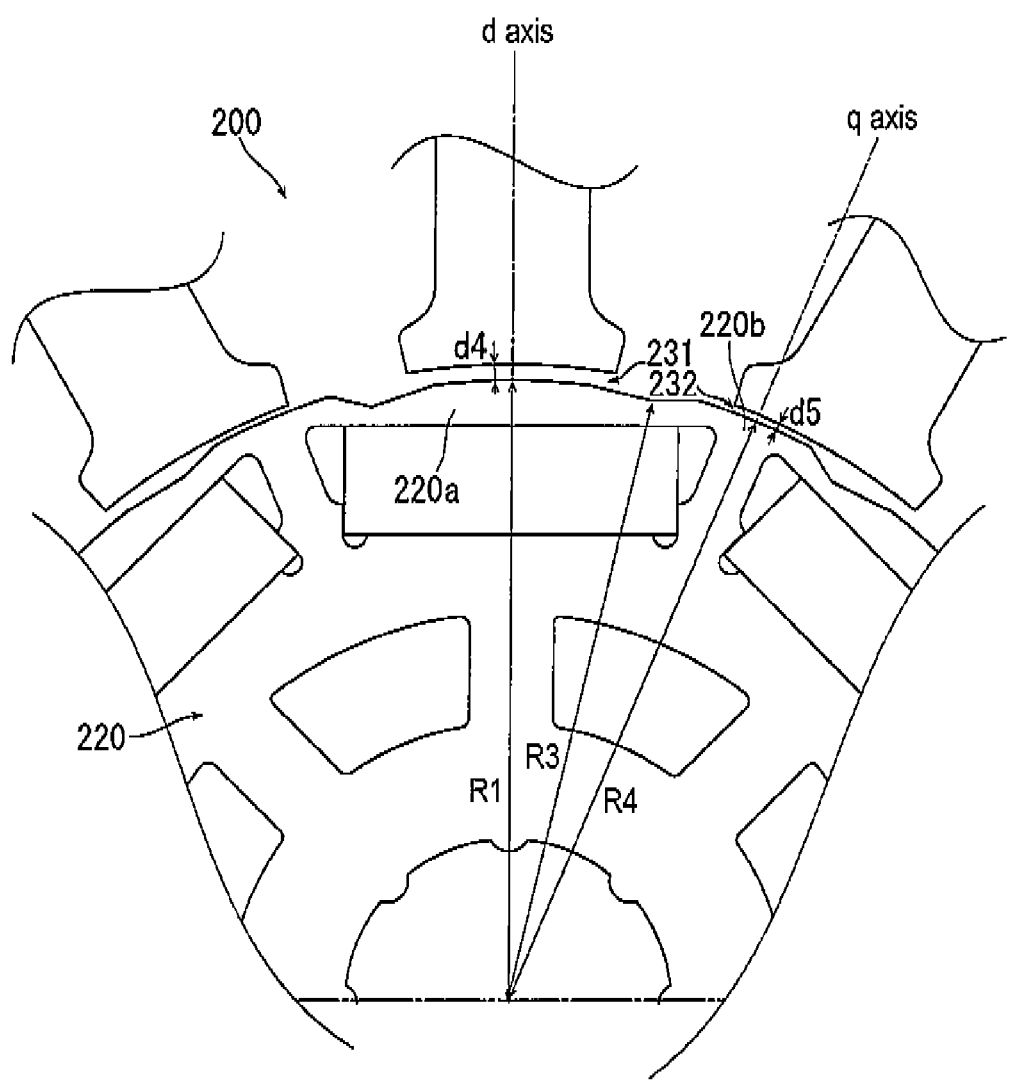
FIG. 5 is an enlarged view of an embedded magnet motor of a modified example of the embodiment of this disclosure.

A modified example of the embodiment will hereunder be explained. For example, according to the embodiment, the diameter R1 of the first portion 20a is equal to the diameter R2 of the second portion 20b (R1=R2). Alternatively, for example, as shown in FIG. 5, according to an embedded magnet motor 200 of the modified example, a diameter R4 of a second portion 220b of a rotor core 220, the second portion 220b corresponding to the q-axis, can be greater than the diameter R1 of a first portion 220a of the rotor core 220, the first portion 220a corresponding to the d-axis (R4>R1). Accordingly, a fourth air gap 232 (a clearance d5) of the second portion 220b is smaller than a fifth air gap 231 (a clearance d4) of the first portion 220a. Accordingly, the q-axis inductance $L_q$ may be increased. As a result, the reluctance torque can be increased.

According to the embodiment, the intermediate portion 20c is formed in the V-shape when seen from the axial direction of the rotor core 20. Alternatively, for example, the intermediate portion 20c may be formed in a shape other than the V-shape (for example, a U shape) when seen from the axial direction of the rotor core 20.

According to the embodiment, the fourth width W4 of the first portion 20a, the fourth width W4 being positioned in the tangential direction, is set smaller than the second width W2 of the distal end portion 11b of the teeth 11 (W4<W2). Alternatively, the fourth width W4 of the first portion 20a may be set equal to or smaller than the second width W2 of the distal end portion 11b of the teeth 11 (W4≤W2).

According to the embodiment, the angle θ of the base portion of the V-shaped intermediate portion 20c, the base portion that is provided at the inner portion of the intermediate portion 20c in the diameter direction, is, for example, 162 degree when seen from the axial direction of the rotor core 20. Alternatively, for example, the angle θ of the base portion of the V-shaped intermediate portion 20c, the base portion that is provided at the inner portion of the intermediate portion 20c in the diameter direction may be the obtuse angle that is other than 162 degrees.

According to the embodiment, the intermediate portion 20c is provided at the first side and the second side in the circumferential direction of the first portion 20a. Alternatively, for example, the intermediate portion 20c may be provided at one of the first side and the second side in the circumferential direction of the first portion 20a.

According to the aforementioned embodiment, the embedded magnet motor (100, 200) includes the stator core (10), the plural permanent magnets (21) each having the rectangular cross section, and the rotor core (20, 220) being provided so as to face the stator core (10), the rotor core (20, 220) being embedded with the permanent magnets (21). The stator core (10) and the rotor core (20, 220) define the first air gap (31) being positioned at the intermediate portion (20c) of the rotor core (20), the first gap (31) being positioned between the stator core (10) and the rotor core (20, 220). The stator core (10) and the rotor core (20, 220) define the second air gap (32) being positioned at the first portion (20a, 220a) corresponding to the first axis (the d-axis) of the rotor core (20, 220), the second air gap (32) being positioned between the stator core (10) and the rotor core (20, 220). The stator core (10) and the rotor core (20, 220) define the third air gap (33) being positioned at the second portion (20b, 220b) corresponding to the second axis (the q-axis) of the rotor core (20, 220), the third air gap (33) being positioned between the stator core (10) and the rotor core (20, 220). On a basis of the first axis (the d-axis) being extended in the same direction as the main magnetic flux and the second axis serving as the direction electrically orthogonal to the first axis, because the diameter (R3) of the intermediate portion (20c) being positioned between the first portion (20a, 220a) and the second portion (20b, 220b) of the rotor core (20) is set smaller than the diameter (R1) of the first portion (20a, 220a) and than the diameter (R2) of the second portion (20b, 220b), the first air gap (31) is set greater than the second air gap (32) and than the third air gap (32).

According to the aforementioned construction, the first air gap 31 that is positioned at the intermediate portion 20c, the first air gap 31 that is positioned between the stator core 10 and the rotor core 20, is set greater than the second air gap 32 (the third air gap 33) that is positioned at the first portion 20a (the second portion 20b) of the rotor core 20, the second air gap 32 (the third air gap 33) that is positioned between the stator core 10 and the rotor core 20. The intermediate portion 20c is positioned between the first portion 20a and the second portion 20b. Thus, because the magnetic flux passing in the d-axis hardly passes through the intermediate portion 20c, the d-axis inductance $L_d$ can be decreased. As a result, because the difference in amount between the q-axis inductance $L_q$ and the d-axis inductance $L_d$ comes to be increased, the reluctance (the torque of the attraction force being generated between the magnetic field from the stator core 10 and the saliency of the rotor core 20) can be increased. In addition, as described above, the plural permanent magnets 21 each having the rectangular cross section are embedded to the rotor core 20. Thus, unlike a case where the permanent magnet 21 having the rectangular cross section is processed to decrease the d-axis inductance $L_d$, the yield rate of the permanent magnet 21 can be inhibited from being decreased. As described above, because the diameter R3 of the intermediate portion 20c is smaller than the diameter R1 of the first portion 20a and than the diameter R2 of the second portion 20b, the shape of the outer circumference of the rotor core 20 can be brought close to the sinewave. Accordingly, the waveform of the induced voltage is prevented from being largely deformed from the sinewave. As a result, the reluctance torque can be increased while inhibiting the yield rate of the permanent magnet 21 from being decreased and inhibiting the waveform of the induced voltage from being largely deformed from the sinewave.

According to the aforementioned embodiment, the first axis serves as the direction along the diameter (R1) of the rotor core (20, 220), the direction that passes through a center of the permanent magnet (21). The second axis serves as the direction along the diameter (R2) of the rotor core (20, 220), the direction that passes through a middle portion of the rotor core 20, the middle portion being positioned between the permanent magnets (21) that are positioned next to each other.

Accordingly, the saliency ratio ($L_q/L_d$) of the embedded magnet motor 100 is greater than, for example, 1. The reluctance torque is proportional to the difference in amount between the q-axis inductance $L_q$ and the d-axis inductance $L_d$. That is, the reluctance torque is increased as the difference in amount between the q-axis inductance $L_q$ and the d-axis inductance $L_d$ a is increased. The reluctance torque is decreased as the difference in amount between the q-axis inductance $L_q$ and the d-axis inductance $L_d$ is decreased.

According to the aforementioned embodiment, the intermediate portion (20c) is formed in the V-shape so as the first air gap (31) to gradually decrease after gradually increasing towards the second axis from the first axis.

According to the aforementioned construction, because the shape of the outer circumference of the rotor core 20 can be brought close to the sinewave, the waveform of the induced voltage can be brought close to the sinewave.

According to the aforementioned embodiment, the stator core (10) includes the plural teeth (11) being provided with the wound portion (11a) that is wound with the winding wire (13). The second portion (20b, 220b) includes the third portion (120b) corresponding to the magnetic path, the third portion (120b) having the sixth width (W6) that is positioned along the tangential direction of the outer circumference of the rotor core (20, 220), the sixth width (We) that is equal to or greater than 20 percent and is equal to or less than 32 percent of the first width (W1) of the wound portion (11a) of the teeth (11) of the stator core (10), the first width (W1) being positioned along the tangential direction of the outer circumference of the rotor core (20, 220).

Accordingly, the motor torque can be increased while comparatively increasing the reluctance torque and the magnet torque (the torque of the attraction force and the repulsive force that are generated between the magnetic field from the stator core 10 and the permanent magnet 21), which is confirmed by the experiment performed by the inventor of this disclosure.

According to the aforementioned embodiment, the first portion (20a, 220a) serves as the portion that includes the first axis and that has the constant diameter (R1). The second portion (20b, 220b) serves as the portion that includes the second axis and that has the constant diameter (R2).

Accordingly, because the diameter R1 (R2) of the first portion 20a (the second portion 20b) does not change, or is constant, or substantially constant, the dimension of the second air gap 32 (the third air gap 33) does not change, or is constant, or substantially constant. Thus, the difference between the dimensions of the first air gap 31 and of the second air gap 32 (the third air gap 33) can securely occur, the first air gap 31 that is positioned at the intermediate portion 20c having the diameter R3 being smaller than the diameter R1 (R2) of the first portion 20a (the second portion 20b), the second air gap 32 (the third air gap 33) that is positioned at the first portion 20a (the second portion 20b) of the rotor core 20.

According to the aforementioned embodiment, the stator core (10) includes the plural teeth (11), the teeth (11) being provided with the distal end portion (11b). The first portion (20a, 220a) serves as a portion that includes the first axis and that has the constant diameter (R1). The first portion (20a, 220a) having the constant diameter (R1) has the fourth width (W4) being positioned in the tangential direction of the outer circumference of the rotor core (20, 220), the fourth width (W4) being set smaller than the second width (W2) of the distal end portion (11b) of the teeth (11) of the stator core (10), the second width (W2) being positioned along the tangential direction.

Thus, because the first portion 20a having the constant diameter R1 can be comparatively small, the dimension of the intermediate portion 20c can be increased that much. As a result, because the shape of the outer circumference of the rotor core 20 can be brought close to the sinewave, the waveform of the induced voltage can be inhibited from being largely deformed from the sinewave.

According to the aforementioned embodiment, the embedded magnet motor (100, 200) includes the plural permanent magnets (21) each having the rectangular cross section; and the rotor core (20, 220) being embedded with the permanent magnets (21), the rotor core (20, 220) being provided so as to be configured to face the stator core (10). The stator core (10) and the rotor core (20, 220) are configured to define the first air gap (31) being positioned at the intermediate portion (20c) of the rotor core (20), the first gap (31) being configured to be positioned between the stator core (10) and the rotor core (20, 220). The stator core (10) and the rotor core (20, 220) are configured to define the second air gap (32) being configured to be positioned at the first portion (20a, 220a) corresponding to the first axis of the rotor core (20, 220), the second air gap (32) being configured to be positioned between the stator core (10) and the rotor core (20, 220). The stator core (10) and the rotor core (20, 220) are configured to define the third air gap (33) being positioned at the second portion (20b, 220b) corresponding to the second axis of the rotor core (20, 220), the third air gap (33) being configured to be positioned between the stator core (10) and the rotor core (20, 220). On a basis of the first axis being extended in the same direction as the main magnetic flux and the second axis serving as the direction electrically orthogonal to the first axis, because the diameter (R3) of the intermediate portion (20c) being positioned between the first portion (20a, 220a) and the second portion (20b, 220b) of the rotor core (20) is set smaller than the diameter (R1) of the first portion (20a, 220a) and than the diameter (R2) of the second portion (20b, 220b), the first air gap (31) is set greater than the second air gap (32) and than the third air gap (32).

According to the aforementioned construction, the first air gap 31 that is positioned at the intermediate portion 20, the first air gap 31 that is positioned between the stator core 10 and the rotor core 20, is set greater than the second air gap 32 (the third air gap 33) that is positioned at the first portion 20a (the second portion 20b) of the rotor core 20, the second air gap 32 (the third air gap 33) that is positioned between the stator core 10 and the rotor core 20. The intermediate portion 20c is positioned between the first portion 20a and the second portion 20b. Thus, because the magnetic flux passing in the d-axis hardly passes through the intermediate portion 20c, the d-axis inductance $L_d$ can be decreased. As a result, because the difference in amount between the q-axis inductance $L_q$ and the d-axis inductance $L_d$ comes to be increased, the reluctance (the torque of the attraction force being generated between the magnetic field from the stator core 10 and the saliency of the rotor core 20) can be increased. In addition, as described above, the plural permanent magnets 21 each having the rectangular cross section are embedded to the rotor core 20. Thus, unlike a case where the permanent magnet 21 having the rectangular cross section is processed to decrease the d-axis inductance $L_d$, the yield rate of the permanent magnet 21 can be inhibited from being decreased. As described above, because the diameter R3 of the intermediate portion 20c is smaller than the diameter R1 of the first portion 20a and than the diameter R2 of the second portion 20b, the shape of the outer circumference of the rotor core 20 can be brought close to the sinewave. Accordingly, the waveform of the induced voltage is prevented from being largely deformed from the sinewave. As a result, the reluctance torque can be increased while inhibiting the yield rate of the permanent magnet 21 from being decreased and inhibiting the waveform of the Induced voltage from being largely deformed from the sinewave.

According to the aforementioned embodiment the rotor core (20, 220) includes the plural clearances (23), the clearance (23) that is positioned at the portion where the permanent magnet (21) is embedded, the clearance (23) that is provided outwardly in the circumferential direction of the rotor core (20, 220), the clearance (23) for preventing the permanent magnet (21) from being demagnetized. The rotor core (20, 220) includes the third portion (120b) corresponding to the magnetic path of the second axis of the rotor core (20, 220), the third portion (120b) being sandwiched by the clearances (23), the third portion (120b) having the sixth width (W6) being positioned in the tangential direction of the outer circumference of the rotor core (20, 220), the sixth width (W6) being constant along the diameter direction of the rotor core (20, 220).

According to the aforementioned construction, the second portion 20b of the rotor core 20, the third portion 120b can be prevented from being small while comparatively increasing the dimension of the clearance 23.

According to the aforementioned embodiment, the stator core (10) includes the plural teeth (11), the teeth (11) being provided with the distal end portion (11b); and the rotor core (20, 220) includes the third portion (120b) corresponding to the magnetic path of the second axis of the rotor core (20, 220), the third portion (120b) being positioned in the tangential direction of the outer circumference of the rotor core (20, 220), the third portion (120b) having the sixth width (W6) that is greater than the third width (W3) of the protrusion (11c) protruding in the peripheral direction of the distal end portion (11b) of the teeth (11) of the stator core (10), the third width (W3) being positioned in the tangential direction.

According to the aforementioned construction, the q-axis inductance $L_d$ is prevented from being small due to the decrease in size of the third portion 120b of the rotor core 20.

According to the aforementioned embodiment, the V-shaped intermediate portion (200) includes the base portion being provided at the inner portion of the intermediate portion (20c) in the diameter direction of the rotor core (20), the base portion having the angle (θ) that is the obtuse angle when seen from the axial direction of the rotor core (20, 220).

According to the aforementioned construction, unlike a case where the angle θ of the base portion of the intermediate portion 20c, the base portion being provided at the inner portion of the intermediate portion 20c in the diameter direction, is an acute angle or a sharp angle, because the diameter of the intermediate portion 20c towards the q-axis from the d-axis slowly changes, the shape of the outer circumference of the rotor core 20 can be further brought close to the sinewave. As a result, the waveform of the induced voltage is further prevented from being largely deformed from the sinewave.

According to the aforementioned embodiment, the intermediate portion (20c) is provided at the first side and the second side in the circumferential direction of the first portion (20a, 220a) of the rotor core (20, 220).

According to the aforementioned construction, the shape of the outer circumference of the rotor core 20 can be brought further close to the sinewave at the first side and the second side in the circumferential direction of the first portion 20a. As a result, the waveform of the induced voltage is further securely prevented from being largely deformed from the sinewave.

According to the aforementioned embodiment, the first portion (20a, 220a) serves as the portion that includes the first axis and that is positioned from the first axis to the intermediate portion (20c) of the rotor core (20, 220). The second portion (20b, 220b) serves as the portion that includes the second axis and that is positioned from the second axis to the intermediate portion (200) of the rotor core (20, 220).

According to the aforementioned construction, because the first portion 20a (the second portion 20b) is connected to the intermediate portion 20c, the shape of the waveform of the induced voltage can be smooth.

According to the aforementioned embodiment, the second portion (220b) includes the diameter (R4) that is greater than the diameter (R1) of the first portion (220a) of the rotor core (220).

Accordingly, the fourth air gap 232 (a clearance d5) of the second portion 220b is smaller than the fifth air gap 231 (a clearance d4) of the first portion 220a. Accordingly, the q-axis inductance $L_q$ may be increased. As a result, the reluctance torque can be increased.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An embedded magnet motor, comprising:
a stator core;
a plurality of permanent magnets each having a rectangular cross section; and
a rotor core being provided so as to face the stator core, the rotor core being embedded with the permanent magnets; wherein
the stator core and the rotor core define a first air gap being positioned at an intermediate portion of the rotor core, the first gap being positioned between the stator core and the rotor core;
the stator core and the rotor core define a second air gap being positioned at a first portion corresponding to a first axis of the rotor core, the second air gap being positioned between the stator core and the rotor core;
the stator core and the rotor core define a third air gap being positioned at a second portion corresponding to a second axis of the rotor core, the third air gap being positioned between the stator core and the rotor core; and
on a basis of the first axis being extended in a same direction as a main magnetic flux and the second axis serving as a direction electrically orthogonal to the first axis, because a diameter of the intermediate portion being positioned between the first portion and the second portion of the rotor core is set smaller than a diameter of the first portion and than a diameter of the second portion, the first air gap is set greater than the second air gap and than the third air gap,
wherein the first axis serves as a direction along the diameter of the rotor core, the direction that passes through a center of the permanent magnet;
wherein the second axis serves as a direction along the diameter of the rotor core, the direction that passes through a middle portion of the rotor core, the middle portion being positioned between the permanent magnets that are positioned next to each other,
wherein the stator core includes a plurality of teeth being provided with a wound portion that is wound with a winding wire; and
wherein the second portion includes a third portion corresponding to a magnetic path, the third portion having a width that is positioned along a tangential direction of an outer circumference of the rotor core, the width being constant or substantially constant along a diameter direction of the rotor core, and the width that s constant or substantially constant being equal to or greater than 20 percent and equal to or less than 32 percent of a width of the wound portion of the teeth of the stator core.

2. The embedded magnet motor according to claim 1, wherein the first portion serves as a portion that includes the first axis and that has a constant diameter; and the second portion serves as a portion that includes the second axis and that has a constant diameter.

3. The embedded magnet motor according to claim 1, wherein the stator core includes a plurality of teeth, the teeth being provided with a distal end portion; the first portion serves as a portion that includes the first axis and that has a constant diameter, and the first portion having the constant diameter has a width being positioned in a tangential direction of an outer circumference of the rotor core, the width being set smaller than a width of the distal end portion of the teeth of the stator core, the width being positioned along the tangential direction.

4. The embedded magnet motor according to claim 1, wherein the rotor core includes a plurality of clearances, each clearance is positioned at a portion where the permanent magnet is embedded, is provided outwardly in a circumferential direction of the rotor core, and is for preventing the permanent magnet from being demagnetized; and the third portion being sandwiched by the clearances.

5. The embedded magnet motor according to claim 1, wherein the stator core includes a plurality of teeth, the teeth being provided with a distal end portion; and the third portion being positioned in the tangential direction of the outer circumference of the rotor core, the width of the third portion is greater than a width of a protrusion protruding in a peripheral direction of the distal end portion of the teeth of the stator core, the width of the protrusion being positioned in the tangential direction.

6. The embedded magnet motor according to claim 1, wherein the intermediate portion is V-shaped, the V-shaped intermediate portion including a base portion being provided at an inner portion of the intermediate portion in a diameter direction of the rotor core, the base portion having an angle that is an obtuse angle when seen from an axial direction of the rotor core.

7. The embedded magnet motor according to claim 1, wherein the intermediate portion is a first intermediate portion, and the first intermediate portion and a second intermediate portion are provided at a first side and a second side in a circumferential direction of the first portion of the rotor core, respectively.

8. The embedded magnet motor according to claim 1, wherein
the first portion serves as a portion that includes the first axis and that is positioned from the first axis to the intermediate portion of the rotor core; and
the second portion serves as a portion that includes the second axis and that is positioned from the second axis to the intermediate portion of the rotor core.

9. The embedded magnet motor according to claim 1, wherein
the second portion includes a diameter that is greater than the diameter of the first portion of the rotor core.

* * * * *